US012576559B2

(12) United States Patent
Matsumoto et al.

(10) Patent No.: US 12,576,559 B2
(45) Date of Patent: Mar. 17, 2026

(54) MOLDED ARTICLE MANUFACTURING METHOD, RESIN IMPREGNATING APPARATUS, AND 3D PRINTER

(71) Applicant: Mitsubishi Gas Chemical Company, Inc., Tokyo (JP)

(72) Inventors: Nobuhiko Matsumoto, Hiratsuka (JP); Kousuke Ikeuchi, Hiratsuka (JP); Ryoma Hashimoto, Hiratsuka (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 232 days.

(21) Appl. No.: 18/039,916

(22) PCT Filed: Oct. 29, 2021

(86) PCT No.: PCT/JP2021/039952
§ 371 (c)(1),
(2) Date: Jun. 1, 2023

(87) PCT Pub. No.: WO2022/118581
PCT Pub. Date: Jun. 9, 2022

(65) Prior Publication Data
US 2024/0116218 A1 Apr. 11, 2024

(30) Foreign Application Priority Data
Dec. 4, 2020 (JP) ................................ 2020-201889

(51) Int. Cl.
*B33Y 80/00* (2015.01)
*B29B 15/12* (2006.01)
(Continued)

(52) U.S. Cl.
CPC ............ *B29B 15/127* (2013.01); *B33Y 70/10* (2020.01); *B33Y 80/00* (2014.12); *B29K 2063/00* (2013.01);
(Continued)

(58) Field of Classification Search
None
See application file for complete search history.

(56) References Cited

U.S. PATENT DOCUMENTS 4,975,232 A * 12/1990 Hattori .................... B29C 70/52 264/1.28
10,081,129 B1 * 9/2018 Alvarado ............... B22F 10/18
(Continued)

FOREIGN PATENT DOCUMENTS

EP 3315570 A1 5/2018
EP 3505331 A1 7/2019
(Continued)

OTHER PUBLICATIONS

JP201548453 Translation (Year: 2025).*

*Primary Examiner* — Joseph S Del Sole
(74) *Attorney, Agent, or Firm* — Fitch, Even, Tabin & Flannery LLP

(57) ABSTRACT

Provided are a method for manufacturing a molded article consisting of a fiber-reinforced composite material containing a cured product of a thermosetting resin or a thermosetting resin composition and continuous reinforcing fibers, the method including, in this order, Steps (I) to (III) described below, a resin impregnating apparatus suitably used for the manufacturing method, and a 3D printer. Step (I): A coating step of coating a surface of a continuous reinforcing fiber bundle with a thermosetting resin or a thermosetting resin composition. Step (II): A resin impregnating step of twisting the continuous reinforcing fiber bundle after step (I) and obtaining a prepreg impregnated with the thermosetting resin or the thermosetting resin composition. Step (III): A heating and molding step of disposing the prepreg obtained in step (II) above and then heating the prepreg.

14 Claims, 3 Drawing Sheets

(51) Int. Cl.

| | |
|---|---|
| ***B33Y 70/10*** | (2020.01) |
| *B29K 63/00* | (2006.01) |
| *B29K 307/04* | (2006.01) |
| *B29L 31/00* | (2006.01) |
| *B33Y 10/00* | (2015.01) |
| *B33Y 30/00* | (2015.01) |

(52) U.S. Cl.
CPC ... *B29K 2307/04* (2013.01); *B29L 2031/7156* (2013.01); *B33Y 10/00* (2014.12); *B33Y 30/00* (2014.12)

(56) References Cited

U.S. PATENT DOCUMENTS

2014/0061974 A1* 3/2014 Tyler ...................... B33Y 30/00 264/401
2016/0151984 A1* 6/2016 Miyao ................... B29C 70/504 428/338
2019/0170297 A1* 6/2019 Criel .......................... F17C 1/06
2019/0382634 A1* 12/2019 Elgimiabi .......... C08G 59/5026
2020/0130276 A1* 4/2020 Ueda ...................... B33Y 30/00

FOREIGN PATENT DOCUMENTS

| | | | | |
|---|---|---|---|---|
| JP | 61-89812 | A | | 5/1986 |
| JP | 6-79796 | A | | 3/1994 |
| JP | 2015-48453 | A | | 3/2015 |
| JP | 2015048453 | A | * | 3/2015 |
| JP | 2016-17110 | A | | 2/2016 |
| JP | 2018-158963 | A | | 10/2018 |
| JP | 2019-48398 | A | | 3/2019 |

* cited by examiner

MOLDED ARTICLE MANUFACTURING METHOD, RESIN IMPREGNATING APPARATUS, AND 3D PRINTER

CROSS-REFERENCE TO RELATED APPLICATIONS

This application is a U.S. national phase application filed under 35 U.S.C. § 371 of International Application Number PCT/JP2021/039952 filed Oct. 29, 2021, designating the United States, which claims priority from Japanese Application Number 2020-201889, filed Dec. 4, 2020.

FIELD OF THE INVENTION

The present invention relates to a method for manufacturing a molded article including a fiber-reinforced composite material, a resin impregnating apparatus, and a 3D printer.

BACKGROUND OF THE INVENTION

In recent years, the use of environmentally-friendly natural gas vehicles (CNG vehicles) and fuel cell vehicles (FCV) has increased. Fuel cell vehicles are powered by fuel cells in which hydrogen is used as fuel, and thus the establishment of hydrogen stations at which vehicles are filled with hydrogen that is compressed to a high pressure is essential.

Thus far, steel tanks have been used as high-pressure gas storage tanks for hydrogen stations for fuel cell vehicles, or in other words, as vehicle-mounted fuel tanks for vehicles such as CNG vehicles and fuel cell vehicles. However, the development of lighter weight high-pressure gas storage tanks using a resin material in the liner or in the outer layer of the tank is progressing. Reducing the weight of a vehicle-mounted fuel tank has benefits such as improving the fuel economy of the vehicle in which the fuel tank is mounted.

Fiber-reinforced composite materials such as carbon fiber-reinforced composite materials (hereinafter also referred to as “fiber reinforced plastics (FRP)”) are attracting attention as alternative materials for metal, because they have a very high level of elastic modulus and strength, and also are lightweight. The demand for FRP is expected to accelerate in automobile structural material applications, wind power generation blade applications, pressure vessel applications, and aerospace applications.

It is known that, when the FRP prepared by using a cured product of a thermosetting resin such as an epoxy resin as a matrix resin is used in pressure vessel applications, molding is performed by a filament winding method. For example, the molding can be performed by winding a reinforcing fiber yarn (tow prepreg) impregnated with a thermosetting resin composition such as an epoxy resin composition around an outer surface of a metal or resin liner to cover the outer surface of the liner, and then curing the composition.

However, in the method described above, a liner, a core, or the like serving as a mold for winding the reinforcing fiber yarn is essential. Consequently, it has been difficult to manufacture a linerless pressure vessel made only of FRP.

Meanwhile, as a method for performing three-dimensional modeling using a prepreg impregnated with a thermosetting resin composition and using no mold, a method using a 3D printer has also been studied.

For example, Patent Document 1 proposes a three-dimensional modeling system including: a head having a supply unit for supplying a continuous material containing a resin and fibers; and a robot arm holding a molding unit in which the continuous material is supplied from the supply unit to form a three-dimensional object, the robot arm capable of moving and rotating the molding unit, and capable of freely changing the positions and direction of the molding unit with respect to the supply unit. In addition, for a head with a supply unit configured to supply a continuous material containing a resin and fibers, proposed is a head including a resin impregnating apparatus configured to impregnate fibers with a thermosetting resin, and for the resin impregnating apparatus, proposed is a resin impregnating apparatus with a resin tank in which the resin is stored.

CITATION LIST

Patent Document

Patent Document 1: JP 2019-48398 A

SUMMARY OF INVENTION

Similarly to Patent Document 1, a known filament winding method employs a method in which a reinforcing fiber yarn is immersed in a resin tank storing a thermosetting resin or a thermosetting resin composition (hereinafter, also referred to as “thermosetting resin or composition”) to impregnate the reinforcing fiber yarn with the thermosetting resin.

However, the method described above has an issue that a thermosetting resin or composition having a short pot life is cured at a stage prior to molding, for example, during storage in a resin tank, and thus it cannot be used.

Meanwhile, in a case where a method other than the dipping method is employed as a method for impregnating a reinforcing fiber yarn with a thermosetting resin or composition, insufficient impregnation of the reinforcing fiber yarn with the thermosetting resin or composition may result in an issue such as deterioration in physical properties of the resulting FRP.

An object of the present invention is to provide a method for manufacturing a molded article including a fiber-reinforced composite material containing a cured product of a thermosetting resin or a thermosetting resin composition and continuous reinforcing fibers, in which a thermosetting resin or thermosetting resin composition having a short pot life can be used, and the impregnation properties of the thermosetting resin or thermosetting resin composition into the continuous reinforcing fiber bundle are good, a resin impregnating apparatus suitably used for the manufacturing method, and a 3D printer.

The present inventors have found that the issues can be solved by a manufacturing method, a resin impregnating apparatus having a predetermined mechanism which is suitably used in the manufacturing method, and a 3D printer, the manufacturing method including, in this order, Steps (I) to (III): Step (I) a coating step of coating a surface of a continuous reinforcing fiber bundle with a thermosetting resin or a thermosetting resin composition; Step (II) a resin impregnating step of twisting the continuous reinforcing fiber bundle after the Step (I) obtaining a prepreg impregnated with the thermosetting resin or the thermosetting resin composition; and Step (III): a heating and molding step of disposing the prepreg and subsequently heating the prepreg.

That is, the present invention relates to the following aspects [1] to [3]:

[1] A method for manufacturing a molded article, the molded article consisting of a fiber-reinforced composite material including: a cured product of a thermosetting resin or a thermosetting resin composition; and a continuous reinforcing fiber, the method including, in this order, the following Steps (I) to (III):

Step (I): A coating step of coating a surface of a continuous reinforcing fiber bundle with a thermosetting resin or a thermosetting resin composition;

Step (II): A resin impregnating step of twisting the continuous reinforcing fiber bundle after the Step (I) and obtaining a prepreg impregnated with the thermosetting resin or the thermosetting resin composition; and Step (III): A heating and molding step of disposing the prepreg obtained in the Step (II) and subsequently heating the prepreg.

[2] A resin impregnating apparatus including: a mechanism configured to feed a continuous reinforcing fiber bundle; a nozzle configured to eject a thermosetting resin or a thermosetting resin composition to a surface of the continuous reinforcing fiber bundle; and a mechanism configured to twist the continuous reinforcing fiber bundle.

[3] A 3D printer including the resin impregnating apparatus described in [2] above.

According to the present invention, it is possible to provide a method for manufacturing a molded article consisting of a fiber-reinforced composite material containing a cured product of a thermosetting resin or composition and continuous reinforcing fibers, in which a thermosetting resin or composition having a short pot life can be used, and the impregnation properties of the thermosetting resin or composition into the continuous reinforcing fiber bundle can be improved, a resin impregnating apparatus suitably used for the manufacturing method, and a 3D printer.

According to the manufacturing method of the present invention, a linerless pressure vessel can be easily manufactured. The pressure vessel is suitable for a vehicle-mounted high-pressure gas storage tank, and because the pressure vessel is lightweight, the pressure vessel can improve the fuel economy of the vehicle on which it is mounted.

DESCRIPTION OF EMBODIMENTS

Method for Manufacturing Molded Article

Figure 1:
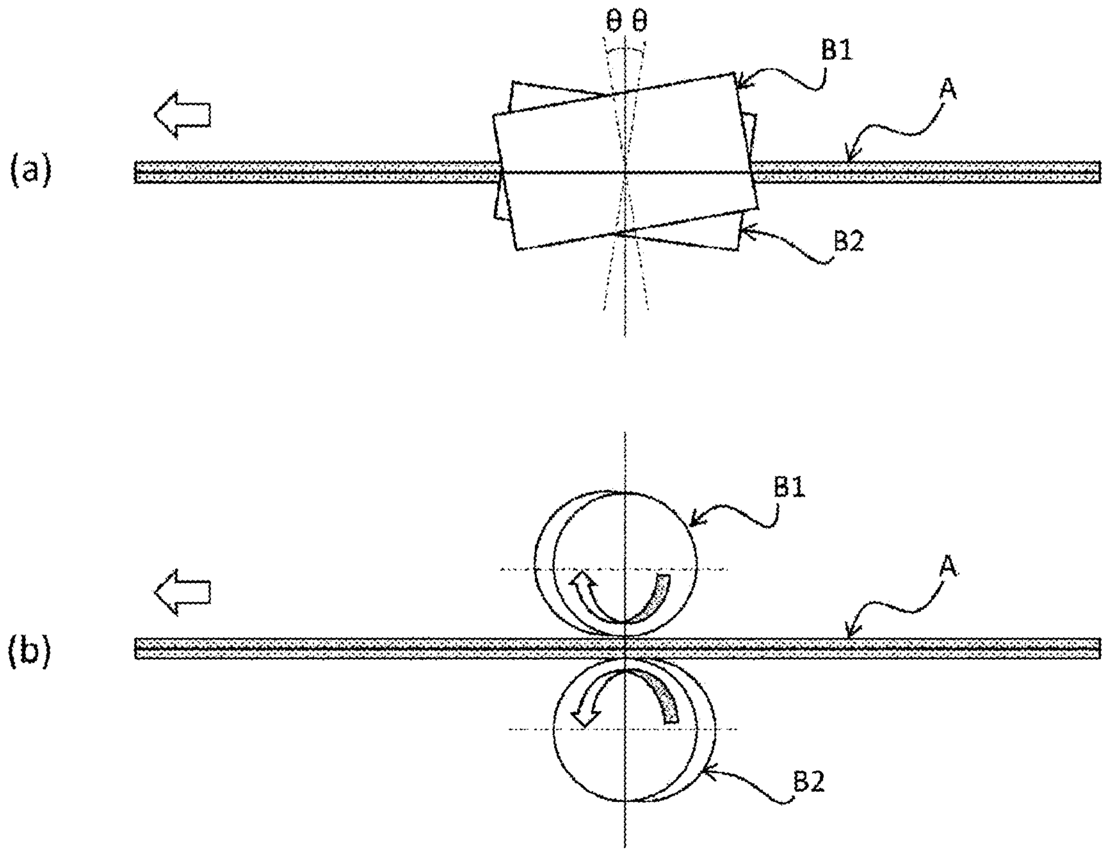
FIG. 1 is a schematic view for explaining a twisting step in Step (II) according to an embodiment.

The method for manufacturing a molded article of the present invention (hereinafter, also simply referred to as "manufacturing method of the present invention") is a method for manufacturing a molded article consisting of a fiber-reinforced composite material containing a cured product of a thermosetting resin or a thermosetting resin composition and continuous reinforcing fibers, the method including, in this order, Steps (I) to (III) described below.

Step (I): A coating step of coating a surface of a continuous reinforcing fiber bundle with a thermosetting resin or a thermosetting resin composition.

Step (II): A resin impregnating step of twisting the continuous reinforcing fiber bundle after Step (I) and obtaining a prepreg impregnated with the thermosetting resin or the thermosetting resin composition.

Step (III): A heating and molding step of disposing the prepreg obtained in Step (II) and subsequently heating the prepreg.

In the present specification, the thermosetting resin means a resin that can be thermally cured alone, and the thermosetting resin composition means a thermosetting composition containing two or more resin components. Typically, the thermosetting resin composition is, for example, a two-part thermosetting resin composition containing a main agent (A) and a curing agent (B).

According to the manufacturing method of the present invention, in the manufacture of a molded article including a fiber-reinforced composite material containing a cured product of a thermosetting resin or a thermosetting resin composition and continuous reinforcing fibers, a thermosetting resin or composition having a short pot life can be used, and the impregnation properties of the thermosetting resin or composition into the continuous reinforcing fiber bundle become good. The reason for this is uncertain but assumed as follows.

In the manufacturing method according to the present invention, a step (coating step) of coating a surface of a continuous reinforcing fiber bundle with a thermosetting resin or a thermosetting resin composition is performed in Step (I). In the known art, as a method for impregnating a continuous reinforcing fiber bundle with a thermosetting resin as a matrix resin precursor, a method for immersing a continuous reinforcing fiber bundle in a thermosetting resin bath has been employed. However, this method has an issue that the thermosetting resin bath is cured in the middle of a manufacturing process. However, in the present invention, performing Step (I) can prevent curing of the resin in the middle of a manufacturing process, even in the case of using a thermosetting resin or composition having a short pot life. For example, when the two-part thermosetting resin composition is used as the thermosetting resin composition, in the coating step, the main agent (A) or a composition containing the main agent (A) and the curing agent (B) or a composition containing the curing agent (B) can be applied without being mixed in advance. Also from this viewpoint, in the manufacturing method according to the present invention, a thermosetting resin composition having a short pot life is easily applied.

In Step (II) of the manufacturing method of the present invention, an operation of twisting the continuous reinforcing fiber bundle which has been coated with the thermosetting resin or composition in Step (I) is performed, and thus the thermosetting resin or composition is allowed to flow, and impregnation into the continuous reinforcing fiber bundle can be promoted. In the case of using the two-part thermosetting resin composition, even when the main agent (A) or a composition containing the main agent (A) and the curing agent (B) or a composition containing the curing agent (B) are each applied to the surface of the continuous reinforcing fiber bundle in Step (I), Step (II) causes the main agent (A) and the curing agent (B) to be sufficiently mixed in the continuous reinforcing fiber bundle. As a result, it is considered that a decrease in the Tg of the cured product due to insufficient mixing of the main agent (A) and the curing agent (B) can be suppressed.

Step (I): Coating Step

In Step (I), a surface of a continuous reinforcing fiber bundle is coated with a thermosetting resin or a thermosetting resin composition. Performing Step (I) makes it possible for a fiber-reinforced composite material and a molded article to be manufactured without causing defects such as curing of the thermosetting resin or composition before molding, even in the case of using a thermosetting resin or composition having a short pot life.

Thermosetting Resin and Thermosetting Resin Composition

The thermosetting resin used in the present invention is not particularly limited as long as it is a resin that can be cured through heating. Also, the thermosetting resin composition used in the present invention is a composition containing the thermosetting resin.

The thermosetting resin is at least one type selected from the group consisting of, for example, epoxy resins, phenolic resins, unsaturated polyester resins, urea resins, melamine resins, unsaturated polyimide resins, cyanate ester resins, silicon resins, urethane resins, casein resins, furan resins, alkyd resins, and xylene resins.

Examples of the two-part thermosetting resin composition containing the main agent (A) and the curing agent (B) include an epoxy resin composition in which the main agent (A) is an epoxy resin and the curing agent (B) is an epoxy resin curing agent, and a urethane resin composition in which the main agent (A) is a polyol and the curing agent (B) is a polyisocyanate. From the viewpoint of ease of impregnation into the continuous reinforcing fiber bundle, and from the viewpoint of the heat resistance, strength, and gas barrier properties such as a hydrogen gas barrier property of the resulting cured product, a two-part epoxy resin composition in which the main agent (A) is an epoxy resin and the curing agent (B) is an epoxy resin curing agent is preferable.

Among the epoxy resin compositions described above, an epoxy resin composition in which the main agent (A) is an epoxy resin (A1) and the curing agent (B) is an epoxy resin curing agent (B1) containing a reaction product (X) of a component (x1) and a component (x2) described below is more preferable. The epoxy resin composition is suitable to manufacture a pressure vessel described below because higher gas barrier properties and impact resistance can be obtained.

(x1) at least one selected from the group consisting of meta-xylylenediamine and para-xylylenediamine, and (x2) at least one selected from the group consisting of unsaturated carboxylic acids represented by General Formula (1) below and derivatives thereof:

(1)

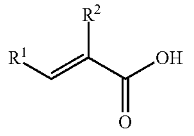

where in Formula (1), $R^1$ and $R^2$ each independently represent a hydrogen atom, an alkyl group having from 1 to 8 carbons, an aryl group having from 6 to 12 carbons, or an aralkyl group having from 7 to 13 carbons.

The cured product of the epoxy resin composition has high gas barrier properties. For example, the hydrogen gas permeability coefficient of the cured product is preferably $8.0\times10^{-11}$ [cc·cm/(cm$^2$·s·cmHg)] or less, more preferably $6.0\times10^{-11}$ [cc·cm/(cm$^2$·s·cmHg)] or less, and even more preferably $4.5\times10^{-11}$ [cc·cm/(cm$^2$·s·cmHg)] or less.

The hydrogen gas permeability coefficient of the cured product of the epoxy resin composition can be measured by the method described in the examples under dry conditions at 23° C.

Epoxy Resin (A1)

The main agent (A): the epoxy resin (A1) (hereinafter, also referred to simply as a "component (A1)") is not particularly limited as long as it is a polyfunctional epoxy resin having two or more epoxy groups, but a polyfunctional epoxy resin containing an aromatic ring or an alicyclic structure in the molecule is preferred when consideration is given to the expression of high gas barrier properties.

Specific examples of the polyfunctional epoxy resin include at least one resin selected from epoxy resins having a glycidylamino group derived from meta-xylylenediamine, epoxy resins having a glycidylamino group derived from para-xylylenediamine, epoxy resins having a glycidylamino group derived from 1,3-bis(aminomethyl) cyclohexane, epoxy resins having a glycidylamino group derived from 1,4-bis(aminomethyl) cyclohexane, epoxy resins having a glycidylamino group derived from diaminodiphenylmethane, epoxy resins having a glycidylamino group and/or a glycidyloxy group derived from a para-aminophenol, epoxy resins having a glycidyloxy group derived from bisphenol A, epoxy resins having a glycidyloxy group derived from bisphenol F, epoxy resins having a glycidyloxy group derived from a phenol novolac, and epoxy resins having a glycidyloxy group derived from resorcinol. In order to improve various performance aspects such as flexibility, impact resistance, and moist heat resistance, two or more types of the epoxy resins described above may be mixed at appropriate ratios and used.

Of the above-described polyfunctional epoxy resins, from the viewpoint of gas barrier properties, the epoxy resin (A1) is preferably one having, as a main component, at least one component selected from the group consisting of an epoxy resin having a glycidylamino group derived from meta-xylylenediamine, an epoxy resin having a glycidylamino group derived from para-xylylenediamine, an epoxy resin having a glycidyloxy group derived from bisphenol A, and an epoxy resin having a glycidyloxy group derived from bisphenol F. From the viewpoint of exhibiting a high hydrogen gas barrier property, the epoxy resin (A1) is preferably one having, as a main component, an epoxy resin having a glycidylamino group derived from meta-xylylenediamine.

Note that "main component" here means that other components may be included within a range that does not depart from the spirit of the present invention, and also means a component that is included in an amount of preferably from 50 to 100 mass %, more preferably from 70 to 100 mass %, and even more preferably from 90 to 100 mass % relative to the total amount.

Epoxy Resin Curing Agent (B1)

From the viewpoint of expressing both high gas barrier properties and impact resistance, the epoxy resin curing agent (B1) (hereinafter, also referred to simply as a "component (B1)") contains a reaction product (X) of a component (x1) and a component (x2) described below:

(x1) at least one selected from the group consisting of meta-xylylenediamine and para-xylylenediamine, and (x2) at least one selected from the group consisting of unsaturated carboxylic acids represented by General Formula (1) below and derivatives thereof;

[Chem. 2]

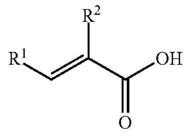

(1)

where in Formula (1), $R^1$ and $R^2$ each independently represent a hydrogen atom, an alkyl group having from 1 to 8 carbons, an aryl group having from 6 to 12 carbons, or an aralkyl group having from 7 to 13 carbons.

Reaction Product (X)

The reaction product (X) is a reaction product of the component (x1) and the component (x2).

The component (x1) is used from the viewpoint of gas barrier properties and is preferably meta-xylylenediamine in terms of gas barrier properties. One type of the component (x1) may be used alone, or two types of the components (x1) may be mixed and used.

The component (x2) is at least one selected from the group consisting of unsaturated carboxylic acids represented by General Formula (1) above and derivatives thereof. Moreover, from the viewpoint of expressing high gas barrier properties and impact resistance, $R^1$ in General Formula (1) above is preferably a hydrogen atom or an alkyl group having from 1 to 8 carbons, more preferably a hydrogen atom or an alkyl group having from 1 to 3 carbons, even more preferably a hydrogen atom or a methyl group, and yet even more preferably a hydrogen atom.

Moreover, from the viewpoint of expressing high gas barrier properties and impact resistance, $R^2$ in General Formula (1) is preferably a hydrogen atom or an alkyl group having from 1 to 8 carbons, more preferably a hydrogen atom or an alkyl group having from 1 to 3 carbons, even more preferably a hydrogen atom or a methyl group, and yet even more preferably a hydrogen atom.

Examples of the derivatives of the unsaturated carboxylic acids represented by General Formula (1) include esters, amides, acid anhydrides, and acid chlorides of the unsaturated carboxylic acids. The ester of the unsaturated carboxylic acid is preferably an alkyl ester, and in terms of obtaining good reactivity, the alkyl has preferably from 1 to 6 carbons, more preferably from 1 to 3 carbons, and even more preferably from 1 to 2 carbons.

Examples of the unsaturated carboxylic acids represented by General Formula (1) above and the derivatives thereof include unsaturated carboxylic acids, such as acrylic acid, methacrylic acid, α-ethylacrylic acid, α-propylacrylic acid, α-isopropylacrylic acid, α-n-butylacrylic acid, α-t-butylacrylic acid, α-pentylacrylic acid, α-phenylacrylic acid, α-benzylacrylic acid, crotonic acid, 2-pentenoic acid, 2-hexenoic acid, 4-methyl-2-pentenoic acid, 2-heptenoic acid, 4-methyl-2-hexenoic acid, 5-methyl-2-hexenoic acid, 4,4-dimethyl-2-pentenoic acid, 4-phenyl-2-butenoic acid, cinnamic acid, o-methyl cinnamic acid, m-methyl cinnamic acid, p-methyl cinnamic acid, and 2-octenoic acid; and esters, amides, acid anhydrides, and acid chlorides of these unsaturated carboxylic acids.

Among the above, from the viewpoint of expressing high gas barrier properties and impact resistance, the component (x2) is preferably at least one selected from the group consisting of acrylic acid, methacrylic acid, crotonic acid, and derivatives of these acids, more preferably at least one selected from the group consisting of acrylic acid, methacrylic acid, crotonic acid, and alkyl esters of these acids, even more preferably at least one selected from the group consisting of acrylic acid, methacrylic acid, and alkyl esters of these acids, still more preferably an alkyl ester of acrylic acid, and still even more preferably methyl acrylate.

One type of the component (x2) may be used alone, or two or more types may be combined and used.

When an unsaturated carboxylic acid, an ester, or an amide is used as the component (x2), the reaction between the component (x1) and the component (x2) is carried out by mixing the component (x1) and the component (x2) under conditions including a temperature of from 0 to 100° C. and more preferably 0 to 70° C., and carrying out a Michael addition reaction and an amide group formation reaction by dehydration, dealcoholization, and deamination under conditions including a temperature of from 100 to 300° C. and preferably from 130 to 250° C.

In this case, in the amide group formation reaction, to complete the reaction, the pressure inside a reaction device can be reduced at the final stage of the reaction as necessary. In addition, a non-reactive solvent can be used to dilute as necessary. Furthermore, a catalyst, such as a phosphite ester, can be added as a dehydrating agent or a dealcoholizing agent.

Meanwhile, when an acid anhydride or an acid chloride of an unsaturated carboxylic acid is used as the component (x2), the reaction is carried out by mixing under conditions including a temperature of from 0 to 150° C. and preferably from 0 to 100° C., and then carrying out a Michael addition reaction and an amide group formation reaction. In this case, in the amide group formation reaction, to complete the reaction, the pressure inside a reaction device can be reduced at the final stage of the reaction as necessary. In addition, a non-reactive solvent can be used to dilute as necessary. Furthermore, a tertiary amine, such as pyridine, picoline, lutidine, or trialkylamine, can be added.

The amide group moiety formed by the reaction between the component (x1) and the component (x2) has high cohesive force, and thus the cured product of the epoxy resin composition, in which the epoxy resin curing agent containing the reaction product of the component (x1) and the component (x2) is used, exhibits high gas barrier properties and good adhesiveness with the continuous reinforcing fibers.

In the reaction product (X), a reaction molar ratio [(x2)/(x1)] of the component (x2) to the component (x1) is preferably in a range from 0.3 to 1.0, and more preferably in a range from 0.6 to 1.0. When the reaction molar ratio is 0.3 or greater, a sufficient amount of the amide groups is produced in the epoxy resin curing agent, and the gas barrier properties and adhesiveness to the reinforcing fibers are exhibited at high levels. Meanwhile, when the reaction molar ratio is in a range of 1.0 or less, the amount of amino groups necessary for reaction with the epoxy groups in the epoxy resin (A1) is sufficient, and excellent thermal resistance and excellent solubility in an organic solvent are exhibited.

The reaction product (X) may be a reaction product of the components (x1) and (x2), and at least one compound selected from the group consisting of the following components (x3), (x4) and (x5).

(x3) At least one component selected from the group consisting of monovalent carboxylic acids represented by $R^3$—COOH and derivatives thereof (where $R^3$ represents a hydrogen atom, an alkyl group having from 1 to 7 carbons and which may have a hydroxyl group, or an aryl group having from 6 to 12 carbons)

(x4) A cyclic carbonate (x5) A mono-epoxy compound having from 2 to 20 carbons

The component (x3) is a monovalent carboxylic acid represented by $R^3$—COOH or a derivative thereof and is used as necessary from the viewpoints of reducing reactivity between the epoxy resin (A1) and the epoxy resin curing agent (B1) containing the reaction product (X), and improving workability, pot life, and the like.

$R^3$ represents a hydrogen atom, an alkyl group having from 1 to 7 carbons and which may have a hydroxyl group, or an aryl group having from 6 to 12 carbons, and $R^3$ is preferably an alkyl group having from 1 to 3 carbons or a phenyl group.

Examples of derivatives of the monovalent carboxylic acid represented by $R^3$—COOH include esters, amides, acid anhydrides, and acid chlorides of the carboxylic acid. The ester of the carboxylic acid is preferably an alkyl ester, and the number of carbons of the alkyl is preferably from 1 to 6, more preferably from 1 to 3, and even more preferably 1 or 2.

Examples of the component (x3) include monovalent carboxylic acids such as formic acid, acetic acid, propionic acid, butyric acid, lactic acid, glycolic acid, and benzoic acid, and derivatives thereof.

One type of the component (x3) may be used alone, or two or more types may be combined and used.

The component (x4), which is a cyclic carbonate, is used as necessary from the viewpoints of reducing reactivity between the epoxy resin (A1) and the epoxy resin curing agent (B1) containing the reaction product (X), and improving workability, pot life, and the like.

From the viewpoint of reactivity with the component (x1), the component (x4) is preferably a cyclic carbonate that is a ring of six or fewer members. Examples include ethylene carbonate, propylene carbonate, glycerin carbonate, 1,2-butylene carbonate, vinylene carbonate, 4-vinyl-1,3-dioxolan-2-one, 4-methoxymethyl-1,3-dioxolan-2-one, and 1,3-dioxan-2-one. Among these, from the viewpoint of gas barrier properties, at least one selected from the group consisting of ethylene carbonate, propylene carbonate, and glycerin carbonate is preferable.

One type of the component (x4) may be used alone, or two or more types may be combined and used.

The mono-epoxy compound, which is the component (x5), is a mono-epoxy compound having from 2 to 20 carbons and is used as necessary, from the viewpoints of reducing reactivity between the epoxy resin (A1) and the epoxy resin curing agent (B1) containing the reaction product (X), and improving workability, pot life, and the like. From the viewpoint of gas barrier properties, the component (x5) is preferably a mono-epoxy compound having from 2 to 10 carbons and is more preferably a compound represented by the following Formula (2).

[Chem. 3]

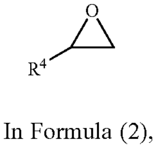

(2)

In Formula (2), $R^4$ represents a hydrogen atom, an alkyl group having from 1 to 8 carbons, an aryl group, a chloromethyl group, or $R^5$—O—$CH_2$—, and $R^5$ represents a phenyl group or a benzyl group.

Examples of the mono-epoxy compound represented by Formula (2) include ethylene oxide, propylene oxide, 1,2-butylene oxide, styrene oxide, epichlorohydrin, phenylglycidyl ether, and benzylglycidyl ether.

One type of the component (x5) may be used alone, or two or more types may be combined and used.

For a case where the component (x3), (x4), or (x5) is used in the reaction product (X), any one type of compound selected from the group consisting of the components (x3), (x4), and (x5) may be used alone, or a combination of two or more types may be used.

Note that the reaction product (X) may be a reaction product that is obtained by reacting, in addition to the components (x1) to (x5), another component within a scope that does not hinder the effect of the present invention. Examples of the other component referred to here include aromatic dicarboxylic acids or derivatives thereof.

However, the usage amount of the "other component" is preferably 30 mass % or less, more preferably 10 mass % or less, and even more preferably 5 mass % or less of the total amount of the reaction components constituting the reaction product (X).

The reaction product of the components (x1) and (x2) and the at least one compound selected from the group consisting of the components (x3), (x4), and (x5) is obtained by using at least one compound selected from the group consisting of the components (x3), (x4), and (x5) in combination with the component (x2) and reacting this combination with the component (x1), which is a polyamine compound. The reaction may be carried out by adding the components (x2) to (x5) in any order and reacting these components with the component (x1), or by mixing the components (x2) to (x5) and then reacting the mixture with the component (x1).

The reaction between the component (x1) and the component (x3) can be carried out under the same conditions as those of the reaction between the component (x1) and the component (x2). When the component (x3) is used, the component (x2) and the component (x3) may be mixed and then reacted with the component (x1), or the component (x1) and component (x2) may be first reacted and then reacted with the component (x3).

Meanwhile, in a case where the component (x4) and/or the component (x5) is used, preferably, the components (x1) and (x2) are first reacted, and then further reacted with the component (x4) and/or the component (x5).

The reaction between the component (x1) and the component (x4) and/or the component (x5) is carried out by mixing the component (x1) and the component (x4) and/or the component (x5) at a temperature of from 25 to 200° C., and then carrying out an addition reaction at a temperature of from 30 to 180° C. and preferably from 40 to 170° C. Furthermore, as necessary, a catalyst such as sodium methoxide, sodium ethoxide, and potassium t-butoxide can be used.

When the reaction is to be carried out, as necessary, the component (x4) and/or the component (x5) may be melted or diluted with a non-reactive solvent and used in order to facilitate the reaction.

Even for a case where the reaction product (X) is a reaction product of the components (x1) and (x2) and at least one compound selected from the group consisting of the components (x3), (x4), and (x5), the reaction molar ratio [(x2)/(x1)] of the component (x2) to the component (x1) is, for the same reason as described above, preferably in a range from 0.3 to 1.0, and more preferably in a range from 0.6 to 1.0. Meanwhile, the reaction molar ratio [{(x3)+(x4)+(x5)}/(x1)] of the components (x3), (x4), and (x5) to the component (x1) is preferably in a range from 0.05 to 3.1, more preferably in a range from 0.07 to 2.5, and even more preferably in a range from 0.1 to 2.0.

However, from viewpoints such as the gas barrier properties, workability, and pot life, the reaction molar ratio [{(x2)+(x3)+(x4)+(x5)}/(x1)] of the components (x2) to (x5) to the component (x1) is preferably in a range from 0.35 to 2.5 and more preferably in a range from 0.35 to 2.0.

The epoxy resin curing agent (B1) may contain a curing agent component other than the reaction product (X). The "curing agent component other than the reaction product (X)" is a component other than the reaction product (X), the component having two or more functional groups that can react with the epoxy group in the epoxy resin (A1), and from the viewpoints of reactivity with the epoxy resin (A1) and the gas barrier properties, examples of preferable components thereof include, other than the component (x1), polyamine compounds having two or more amino groups per molecule, and modified products of the polyamine compounds.

Examples of the polyamine compound include chain-like aliphatic polyamine compounds, such as ethylenediamine, diethylenetriamine, triethylenetetramine, tetraethylenepentamine, pentaethylenehexamine, and hexamethylenediamine; polyamine compounds having an alicyclic structure, such as 1,2-bis(aminomethyl) cyclohexane, 1,3-bis(aminomethyl) cyclohexane, 1,4-bis(aminomethyl) cyclohexane, mencene diamine, isophoronediamine, norbornanediamine, and 1,4-diamino-3,6-diethylcyclohexane; polyamine compounds having an aromatic ring, such as ortho-xylylenediamine, meta-xylylenediamine, para-xylylenediamine, phenylenediamine, diaminodiphenylmethane, and diaminodiphenylsulfone; polyamine compounds having a heterocyclic structure, such as N-aminomethylpiperazine and N-aminoethylpiperazine; and polyether polyamine compounds. One of these can be used alone, or two or more can be combined and used. Among these, the polyamine compound is more preferably at least one selected from the group consisting of 1,2-bis(aminomethyl) cyclohexane, 1,3-bis(aminomethyl) cyclohexane, 1,4-bis(aminomethyl) cyclohexane, isophoronediamine, ortho-xylylenediamine, meta-xylylenediamine, and para-xylylenediamine.

Examples of the modified product of the polyamine compound include a reaction product of a polyamine compound and an epoxy compound; and a Mannich reaction product of a polyamine compound, a phenol-based compound, and an aldehyde compound.

However, from the viewpoint of expressing high gas barrier properties and impact resistance, the content of the reaction product (X) in the epoxy resin curing agent (B1) is preferably high. From the abovementioned viewpoint, the content of the reaction product (X) in the epoxy resin curing agent (B1) is preferably 50 mass % or more, more preferably 70 mass % or more, even more preferably 80 mass % or more, and yet even more preferably 90 mass % or more. Furthermore, the upper limit is 100 mass %.

The ratio of the epoxy resin (A1) and the epoxy resin curing agent (B1) in the epoxy resin composition may be a standard ratio that is ordinarily used for a case where an epoxy resin reaction product is produced through a reaction between an epoxy resin and an epoxy resin curing agent. Specifically, a ratio (the number of active amine hydrogens in the epoxy resin curing agent (B1))/(the number of epoxy groups in the epoxy resin (A1)) of the number of active amine hydrogens in the epoxy resin curing agent (B1) to the number of epoxy groups in the epoxy resin (A1) is preferably in a range from 0.2 to 12.0. From the viewpoint of expressing high gas barrier properties and impact resistance, the ratio (the number of active amine hydrogens in the epoxy resin curing agent (B1))/(the number of epoxy groups in the epoxy resin (A1)) is more preferably in a range from 0.4 to 10.0, even more preferably from 0.6 to 8.0, yet even more preferably from 0.9 to 6.0, and still more preferably more than 1.0 and 5.0 or less.

From the viewpoint of further improving impact resistance, the ratio (the number of active amine hydrogens in the epoxy resin curing agent (B1))/(the number of epoxy groups in the epoxy resin (A1)) is more preferably 1.1 or more, and from the viewpoint of further improving the hydrogen gas barrier property, the ratio thereof is more preferably 4.0 or less, and even more preferably 3.2 or less.

The epoxy resin composition may be an epoxy resin composition in which the main agent (A) is an epoxy resin (A1) and the curing agent (B) is an epoxy resin curing agent not containing the reaction product (X).

The epoxy resin curing agent is preferably the polyamine compound or a modified product thereof from the viewpoint of reactivity with the epoxy resin (A1) and gas barrier properties, and the polyamine compound is more preferably at least one selected from the group consisting of 1,2-bis (aminomethyl) cyclohexane, 1,3-bis(aminomethyl) cyclohexane, 1,4-bis(aminomethyl) cyclohexane, isophoronediamine, ortho-xylylenediamine, meta-xylylenediamine, and para-xylylenediamine.

In this case, a preferred range of the ratio (the number of active amine hydrogens in the epoxy resin curing agent)/(the number of epoxy groups in the epoxy resin (A1)) of the number of active amine hydrogens in the epoxy resin curing agent to the number of epoxy groups in the epoxy resin (A1) is the same as the range described in the ratio (the number of active amine hydrogens in the epoxy resin curing agent (B1))/(the number of epoxy groups in the epoxy resin (A1)).

Solvent

The composition of the main agent (A), the composition of the curing agent (B), and the thermosetting resin composition such as an epoxy resin composition as used in Step (I) may further contain a solvent from the viewpoint of lowering the viscosity of the composition to increase the impregnation properties of the composition into the continuous reinforcing fiber bundle and from the viewpoint of adjusting the pot life.

In the present invention, the "solvent" is a concept including both a reactive solvent such as a reactive diluent and a non-reactive solvent. From the viewpoint of improving the pot life, the solvent is preferably a non-reactive solvent.

Specific examples of the non-reactive solvent include alcohol-based solvents, such as methanol, ethanol, 1-propanol, 2-propanol, 1-butanol, 2-butanol, 2-methoxyethanol, 2-ethoxyethanol, 2-propoxyethanol, 2-butoxyethanol, 1-methoxy-2-propanol, 1-ethoxy-2-propanol, and 1-propoxy-2-propanol; ester-based solvents, such as ethyl acetate and butyl acetate; ketone-based solvents, such as acetone and methyl isobutyl ketone; ether-based solvents, such as diethyl ether and diisopropyl ether; hydrocarbon-based solvents, such as toluene; and non-reactive diluents, such as benzyl alcohol, and of these, a single type may be used, or two or more types may be used.

From the viewpoint of the solubility of the epoxy resin (A1) and the epoxy resin curing agent (B1) and the viewpoint of the ease of removing the solvent, the solvent is preferably at least one type of non-reactive diluent selected from the group consisting of alcohol-based solvents, ester-based solvents, and hydrocarbon-based solvents, having 8 or less carbons, is more preferably at least one type selected from the group consisting of methanol, ethanol, 1-propanol, 2-propanol, 1-butanol, 2-butanol, ethyl acetate, and toluene, and is even more preferably at least one type selected from the group consisting of methanol and ethyl acetate.

When the composition of the main agent (A), the composition of the curing agent (B), or the thermosetting resin composition contains a solvent, the content of the solvent is not particularly limited, but from the viewpoint of increasing the impregnation properties of the composition into the continuous reinforcing fiber bundle and the viewpoint of adjusting the pot life, the content of the solvent in each of the compositions is preferably 5 mass % or more. From the viewpoint of ease of removing the solvent and controlling the amount of impregnation into the continuous reinforcing fiber bundle, the content of the solvent in each of the compositions is preferably 95 mass % or less, more preferably 90 mass % or less, even more preferably 80 mass % or less, and yet even more preferably 70 mass % or less.

In the manufacturing method of the present invention, a composition having a low content of a solvent and a solvent-free composition can also be used as the thermosetting resin composition. In general, a thermosetting resin composition containing a non-reactive solvent can maintain a longer pot life. Since Step (I) is performed in the manufacturing method of the present invention, even a solvent-free composition having a short pot life can be used.

That is, the composition of the main agent (A) and the composition of the curing agent (B) used in the present invention may have a low content of a solvent, and may be solvent-free.

From the viewpoint of ease of removing the solvent and from the viewpoint of controlling the amount of impregnation into the continuous reinforcing fiber bundle, for example, the content of the solvent in the composition of the main agent (A), the composition of the curing agent (B), or the thermosetting resin composition can be even more preferably 50 mass % or less, yet even more preferably 45 mass % or less, and still more preferably 40 mass % or less. In particular, from the viewpoint of ease of removing the solvent and from the viewpoint of controlling the amount of impregnation into the continuous reinforcing fiber bundle, the composition of the main agent (A) is preferably solvent-free. In addition, the content of the solvent in the composition of the curing agent (B) is preferably 40 mass % or less.

In the present invention, the thermosetting resin composition having a short pot life refers to, for example, in the case of a two-part thermosetting resin composition, a composition in which the pot life after mixing of the main agent (A) and the curing agent (B) is preferably 1 hour or shorter, more preferably 30 minutes or shorter, even more preferably 20 minutes or shorter, yet even more preferably 10 minutes or shorter, and still more preferably shorter than 10 minutes. More specifically, the thermosetting resin composition means a thermosetting resin composition in which the time (gelation time) until the thermosetting resin composition turns into a gel state during being left to stand at 23° C. after mixing of the main agent (A) and the curing agent (B) is preferably 1 hour or shorter, more preferably 30 minutes or shorter, even more preferably 20 minutes or shorter, yet even more preferably 10 minutes or shorter, and still more preferably shorter than 10 minutes. The gelation time can be measured using a rheometer. Specifically, the storage elastic modulus G' and the loss modulus G" of the thermosetting resin or composition are measured at a temperature of 23° C., a frequency of 1 Hz, and an inter-plate distance of 0.5 mm using a rheometer, and a point at which G' intersects with G" is defined as a gelation time.

The thermosetting resin composition may contain, as necessary and within a range that does not impair the effect of the present invention, additives such as a coupling agent, a curing accelerator, a wetting agent, a rubber, a thermoplastic resin, a tackifier, an antifoaming agent, a rust-proofing agent, a lubricant, a pigment, an oxygen scavenger, a UV absorber, and an antioxidant.

When the above-described composition contains additives, the total content of the additives in the composition is preferably 20.0 parts by mass or less, and more preferably from 0.001 to 15.0 parts by mass, per 100 parts by mass of the thermosetting resin in the thermosetting resin composition (the total amount of the main agent (A) and the curing agent (B) in the case of the two-part type).

In terms of obtaining the effects of the present invention, the content of the thermosetting resin (the main agent (A) and the curing agent (B) in the case of the two-part type) in the solid content of the thermosetting resin composition is preferably 60 mass % or more, more preferably 70 mass % or more, even more preferably 80 mass % or more, and yet even more preferably 85 mass % or more, and the upper limit is 100 mass %. The "solid content of the thermosetting resin composition" means components excluding the solvent in the thermosetting resin.

Continuous Reinforcing Fiber

The continuous reinforcing fibers used in the present invention are reinforcing fibers having a fiber length of more than 100 mm.

Examples of the shape of the continuous reinforcing fibers include tow, sheet, and tape shapes, and the continuous reinforcing fibers constituting a sheet or tape include, for example, unidirectional (UD) materials, textiles, and non-woven fabrics.

From the viewpoint of obtaining a molded article by the manufacturing method of the present invention, the shape of the continuous reinforcing fibers is preferably a tow or tape shape, and the tow (continuous reinforcing fiber yarn) is more preferable. As the continuous reinforcing fiber yarn, a fiber bundle (roving) having a flat cross section can also be used, in addition to a fiber bundle having a substantially circular cross section.

As single yarns constituting the continuous reinforcing fiber, fibers having a flat cross section can also be used, in addition to fibers having a substantially circular cross section.

From the viewpoint of easily obtaining a high strength and a high elastic modulus, the number of fiber bundles (the number of filaments) constituting the continuous reinforcing fiber bundle is preferably from 0.3K to 60K, more preferably from 3K to 60K, and even more preferably from 6K to 50K.

The average fiber length of the continuous reinforcing fiber bundle is not particularly limited, but from the viewpoint of molding processability, the average fiber length is preferably from 100 to 100000 m, and more preferably from 500 to 10000 m.

The larger the average fineness of the continuous reinforcing fiber bundle is, the more the production efficiency of the molded article is improved. From the viewpoint of production efficiency, the viewpoint of molding processability, and the viewpoint of easily obtaining a high strength and a high elastic modulus, the average fineness of the continuous reinforcing fiber bundle is preferably from 50 to 10000 tex (g/1000 m), more preferably from 200 to 7500 tex, and even more preferably from 500 to 5000 tex.

Also, the average tensile modulus of the continuous reinforcing fiber bundle is preferably from 100 to 1000 GPa.

Examples of materials of the continuous reinforcing fibers include inorganic fibers, such as glass fibers, carbon fibers, metal fibers, boron fibers, basalt fibers, and ceramic fibers; and organic fibers, such as aramid fibers, polyoxymethylene fibers, aromatic polyamide fibers, polyparaphenylene benzobisoxazole fibers, and ultra-high molecular weight polyethylene fibers. Among these, inorganic fibers are preferable from the viewpoint of obtaining a high strength, and at least one type selected from the group consisting of glass fibers, carbon fibers, and basalt fibers is more preferable because of the fibers being lightweight with high strength and a high elastic modulus, and carbon fibers are even more preferable.

Examples of carbon fibers include polyacrylonitrile-based carbon fibers and pitch-based carbon fibers. In addition, a carbon fiber made from a plant-derived raw material, such as lignin or cellulose, can also be used.

The continuous reinforcing fibers used in the present invention may be treated with a treatment agent. Examples of the treatment agent include a surface treatment agent or a sizing agent.

A silane coupling agent is preferable as the surface treatment agent. Examples of the silane coupling agent include a silane coupling agent having a vinyl group, a silane coupling agent having an amino group, a silane coupling agent having an epoxy group, a silane coupling agent having a (meth)acrylic group, and a silane coupling agent having a mercapto group.

Examples of the sizing agent include urethane-based sizing agents, epoxy-based sizing agents, acrylic-based sizing agents, polyester-based sizing agents, vinyl ester-based sizing agents, polyolefin-based sizing agents, polyether-based sizing agents, and carboxylic acid-based sizing agents, and of these, a single sizing agent can be used, or two or more can be used in combination. Examples of combinations of two or more sizing agents include urethane/epoxy-based sizing agents, urethane/acrylic-based sizing agents, and urethane/carboxylic acid-based sizing agents.

Among these, from the viewpoints of improving the interfacial adhesiveness to a cured product of a thermosetting resin or composition, particularly of a cured product of an epoxy resin composition, and further improving the strength and impact resistance of the obtained molded article, the continuous reinforcing fibers are preferably treated with one or more types of sizing agents selected from the group consisting of urethane-based sizing agents, epoxy-based sizing agents, and urethane/epoxy-based sizing agents, and are more preferably treated with an epoxy-based sizing agent.

From the viewpoints of improving the interfacial adhesiveness to a cured product of a thermosetting resin or a thermosetting resin composition and further improving the strength and impact resistance of the resulting molded article, the amount of the treatment agent is preferably from 0.001 to 5 mass %, more preferably from 0.1 to 3 mass %, and even more preferably from 0.5 to 2 mass %, relative to the amount of the continuous reinforcing fibers.

Commercially available products can be also used as the continuous reinforcing fibers. Examples of commercially available products of carbon fibers that are continuous reinforcing fibers include Torayca (trade name) fibers of the series "T300", "T300B", "T400HB", "T700SC", "T800SC", "T800HB", "T830HB", "T1000 GB", "T100GC", "M35JB", "M40JB", "M46JB", "M50JB", "M55J", "M55JB", "M60JB", "M30SC", and "Z600", and Torayca Cloth (trade name) of the series "C06142", "C06151B", "C06343", "C06343B", "C06347B", "C06644B", "CK6244C", "CK6273C", and "CK6261C", the "UT70" series, the "UM46" series, and the "BT70" series, available from Toray Industries, Inc. Examples of commercially available products of glass fibers include "E-glass yam" series, available from Nitto Boseki Co., Ltd.

In the case of using the two-part thermosetting resin composition containing the main agent (A) and the curing agent (B), examples of aspects of the coating step of Step (I) includes an aspect including a step of coating the surface of the continuous reinforcing fiber bundle with the main agent (A) or a composition thereof and a step of coating the surface of the continuous reinforcing fiber bundle with the curing agent (B) or a composition thereof; and an aspect including a step of mixing the main agent (A) or a composition thereof with the curing agent (B) or a composition thereof in advance and then coating the surface of the continuous reinforcing fiber bundle with the mixture. Examples of the method for mixing the main agent (A) with the curing agent (B) in advance include a method for mixing the main agent (A) or a composition thereof with the curing agent (B) or a composition thereof using a mixer; and a method for feeding the main agent (A) or a composition thereof and the curing agent (B) or a composition thereof from both sides of a T-shaped pipe to subject the main agent (A) or the composition thereof and the curing agent (B) or the composition thereof to collisional mixing.

When a thermosetting resin composition having a short pot life is used, Step (I) preferably includes a step of coating the surface of the continuous reinforcing fiber bundle with the main agent (A) or a composition thereof and a step of coating the surface of the continuous reinforcing fiber bundle with the curing agent (B) or a composition thereof.

In Step (I), the method for coating the surface of the continuous reinforcing fiber bundle with the thermosetting resin or composition is not particularly limited, and examples thereof include a method for ejecting the main agent (A), the curing agent (B), the thermosetting resin, or a composition thereof to the surface of the continuous reinforcing fiber bundle, through a nozzle capable of supplying the thermosetting resin or composition.

In the case of including the step of coating the surface of the continuous reinforcing fiber bundle with the main agent (A) or a composition thereof and the step of coating the surface of the continuous reinforcing fiber bundle with the curing agent (B) or a composition thereof, the coating is preferably performed by ejecting the main agent (A) or the composition thereof to one side surface of the continuous reinforcing fiber bundle and ejecting the curing agent (B) or the composition thereof to the other side surface of the continuous reinforcing fiber bundle, from the viewpoint of preventing curing of the thermosetting resin composition during the manufacturing process. The "other side surface" is preferably a side surface facing the "one side surface".

Step (II): Resin Impregnating Step

In Step (II), the continuous reinforcing fiber bundle is twisted after Step (I), and impregnated with the thermosetting resin or the thermosetting resin composition to obtain a prepreg. Step (II) is performed, and thus the thermosetting resin or composition is allowed to flow and impregnation into the continuous reinforcing fiber bundle can be promoted. In the case of using the two-part thermosetting resin composition, even when the main agent (A) or a composition containing the main agent (A) and the curing agent (B) or a composition containing the curing agent (B) are each applied to the continuous reinforcing fiber bundle in Step (I), the main agent (A) and the curing agent (B) are sufficiently mixed in the continuous reinforcing fiber bundle.

In Step (II), the continuous reinforcing fiber bundle obtained in Step (I) is twisted (twisting step). The twisting direction is preferably one direction, and is preferably a circumferential direction substantially perpendicular to the longitudinal direction of the continuous reinforcing fiber bundle. For example, when the continuous reinforcing fiber bundle is a tow, it is twisted in a circumferential direction substantially perpendicular to the longitudinal direction of the tow. This operation enables the continuous reinforcing fiber bundle to be sufficiently impregnated with the thermosetting resin or composition applied in Step (I).

The number of turns to twist the continuous reinforcing fiber bundle is preferably from 20 to 300 turns, more preferably from 50 to 200 turns, and even more preferably from 70 to 150 turns per meter of the length of the continuous reinforcing fiber, from the viewpoint of sufficiently impregnating the continuous reinforcing fiber with the thermosetting resin or composition applied in Step (I).

The twisting step of Step (II) can also be performed by the mechanism illustrated in FIG. 1. FIGS. 1(*a*) and 1(*b*) are schematic views for explaining an embodiment of the twisting step of Step (II), and FIG. 1(*a*) is a top view and FIG. 1(*b*) is a side view. In FIG. 1, A represents a continuous reinforcing fiber yarn after applying a thermosetting resin or a thermosetting resin composition in Step (I), and B1 and B2 represent take-up rolls. The continuous reinforcing fiber yarn A sandwiched between the two take-up rolls B1 and B2 is fed in the longitudinal direction (axial direction) of the continuous reinforcing fiber yarn A by the rotation of the take-up rolls. Here, as illustrated in FIG. 1(*a*), the rotation axes of the two take-up rolls are inclined by 0° in directions opposite to each other, and thus the continuous reinforcing fiber yarn A can be rotated in the circumferential direction, and can be taken up in the axial direction while the continuous reinforcing fiber yarn is twisted.

Step (II) preferably includes an untwisting step after twisting the continuous reinforcing fiber bundle. The untwisting step is performed, and thus the restoring force of the twisted continuous reinforcing fiber bundle serves as a driving force to cause the thermosetting resin or composition to be further flowed. Accordingly, the impregnation of the thermosetting resin or composition into the continuous reinforcing fiber bundle and the mixing of the thermosetting resin or composition in the continuous reinforcing fiber bundle can be promoted.

The untwisting step is performed by twisting the continuous reinforcing fiber bundle in a direction opposite to the twisting direction in the twisting step. In the case of using a twisting mechanism illustrated in FIG. 1, the twist can be untwisted by inclining the rotation axes of the two take-up rolls by 0° in the directions opposite to those in the twisting step.

The untwisting step may be performed alternately with the twisting step. For example, in the twisting step, the continuous reinforcing fiber bundle is twisted once in a circumferential direction substantially perpendicular to the longitudinal direction of the continuous reinforcing fiber bundle, and then twisted once in the opposite direction, thereby enabling the twist to be untwisted. The series of operations is repeated, and thus the continuous reinforcing fiber bundle can be sufficiently impregnated with the thermosetting resin or composition.

When the untwisting step is performed, the number of turns to untwist the continuous reinforcing fiber bundle is preferably the same as the number of turns to twist the continuous reinforcing fiber bundle in the twisting step, and the number of turns per meter of the length of the continuous reinforcing fiber bundle is preferably from 20 to 300 turns, more preferably from 50 to 200 turns, and even more preferably from 70 to 150 turns.

The twisting step and the untwisting step in Step (II) may be performed manually, or may be performed mechanically using a device equipped with a twisting mechanism, such as a resin impregnating apparatus described below.

After the twisting step, or after the untwisting step when the untwisting step has been performed, a step of removing the excess thermosetting resin or composition applied to the continuous reinforcing fiber bundle may be performed. In the following description, the step of removing the excess thermosetting resin or composition is also referred to as a "squeezing step". Performing this step causes the impregnation of the thermosetting resin or composition into the continuous reinforcing fiber bundle to be further promoted. Further, the step is performed, and thus the cross section perpendicular to the traveling direction (longitudinal direction) of the continuous reinforcing fiber bundle becomes a flat shape such as an ellipse. Accordingly, it is possible to suppress the formation of gaps due to formation of bumps (crimps) when the prepreg is laminated in the molding of Step (III) and to suppress a decrease in strength. The squeezing step can be performed using, for example, nip rolls.

In addition, after the twisting step, or after the untwisting step when the untwisting step has been performed, a step of removing the solvent and the like contained in the thermosetting resin composition (solvent removing step) may be performed as necessary. The solvent removing step is usually performed under heating from the viewpoint of productivity. The heating conditions are not particularly limited as long as the solvent can be removed and curing of the thermosetting resin does not excessively proceed, and may be appropriately selected depending on the types of the thermosetting resin and the solvent. For example, a heating temperature in a range from 30 to 100° C., and a heating time in a range from 10 seconds to 10 minutes can be selected.

The solvent removing step can be performed by a known method using a hot air dryer, a heater, a heating roll, a hot plate, or the like. Examples of drying methods include a method of passing through a heating atmosphere using a hot air dryer, a heater, or the like, and a method of contacting with a heating body such as a heating roll or a hot plate. Among these, a method of using a hot air dryer is preferable.

Step (I) and Step (II) described above are performed, thereby obtaining a prepreg in which the continuous reinforcing fiber bundle is impregnated with the thermosetting resin or composition.

The obtained tow prepreg may be wound temporarily on a bobbin, but from the viewpoint of productivity, the tow prepreg is preferably subjected to Step (III) without being wound on the bobbin.

From the viewpoint of productivity of the molded article, Step (I) and Step (II) are performed using a resin impregnating apparatus including: a mechanism that feeds the continuous reinforcing fiber bundle; a nozzle that ejects the thermosetting resin or the thermosetting resin composition to the surface of the continuous reinforcing fiber bundle; and a mechanism that twists the continuous reinforcing fiber bundle. The resin impregnating apparatus will be described later.

Step (III): Heat-Molding Step

In Step (III), the prepreg obtained in Step (II) is disposed and then heated to obtain a molded article. "Disposition of the prepreg" means that the prepreg is laminated to have a desired molded article shape.

The method for disposing the prepreg can be appropriately selected depending on the shape of the prepreg and the resulting molded article. For example, when the prepreg is a tow prepreg, the braiding method, the winding method, the 3D printing method, or the like can be used. The braiding method and the winding method can be performed by known methods. When the 3D printing method is used, it is preferable to use the 3D printer of the present invention described below.

From the viewpoint of enabling a molded article such as a pressure vessel to be molded without using a core such as a mandrel, the molding method in Step (III) is preferably the braiding method or the 3D printing method, and from the viewpoint of molding a complicated shape, it is more preferably the 3D printing method.

The heating in Step (III) is performed by a known method at a temperature and for a time sufficient to cure the thermosetting resin contained in the prepreg after being disposed. From the viewpoint of improving productivity, the heating temperature is preferably in a range from 80 to 150° C., and the heating time is preferably in a range from 10 minutes to 5 hours.

A molded article including a fiber-reinforced composite material containing a cured product of a thermosetting resin or a thermosetting resin composition and continuous reinforcing fibers can be efficiently manufactured by the manufacturing method including, in this order, Steps (I) to (III) described above.

The content of the continuous reinforcing fibers in the molded article obtained by the manufacturing method of the present invention is not particularly limited, but from the viewpoint of the molded article exhibiting a high strength and a high elastic modulus, the volume fraction (Vf) of continuous reinforcing fibers is preferably in a range of 10% or more, more preferably 20% or more, even more preferably 30% or more, and yet even more preferably 40% or more. In addition, from the viewpoints of the gas barrier properties and impact resistance of the molded article, the volume fraction is preferably in a range of 98% or less, more preferably 95% or less, even more preferably 80% or less, and yet even more preferably 70% or less.

A volume fraction (Vf) of the continuous reinforcing fibers in the molded article can be calculated from the following equation.

Vf (%)={(mass (g) of continuous reinforcing fibers)/(specific gravity of continuous reinforcing fibers)}+[{(mass (g) of continuous reinforcing fibers)/(specific gravity of continuous reinforcing fibers)}+{(mass (g) of cured product of thermosetting resin (composition))/(specific gravity of cured product of thermosetting resin (composition))}]×100

Furthermore, from the viewpoint of the molded article exhibiting a high strength and a high elastic modulus, the total content of the continuous reinforcing fibers and cured product of the thermosetting resin or composition in the molded article is preferably 70 mass % or more, more preferably 80 mass % or more, and even more preferably 90 mass % or more, and the upper limit is 100 mass %.

Pressure Vessel

An example of the molded article manufactured by the manufacturing method of the present invention includes a pressure vessel. In particular, when the epoxy resin composition in which the main agent (A) is the epoxy resin (A1) and the curing agent (B) is the epoxy resin curing agent (B1) is used as the thermosetting resin composition, the resulting pressure vessel has good gas barrier properties such as a hydrogen gas barrier property, and is also excellent in lightweight property, pressure resistance, and impact resistance.

The material stored in the pressure vessel is, for example, a gas or liquid at 25° C. and 1 atm, and is preferably a gas at 25° C. and 1 atm. Specific examples of the gas include hydrogen, oxygen, carbon dioxide, nitrogen, argon, LPG, alternative chlorofluorocarbons, and methane.

Among these, the gas is preferably hydrogen from the viewpoint of efficacy when the epoxy resin composition is used as the thermosetting resin composition.

Examples of the pressure vessel include (1) a pressure vessel having a configuration including a liner and an outer layer for reinforcing the liner, and (2) a linerless pressure vessel, and the manufacturing method of the present invention can be applied to both the pressure vessels (1) and (2). In the pressure vessel (1), the manufacturing method of the present invention can be applied to the manufacture of either one or both of the liner and the outer layer.

From the viewpoint of the efficacy of the present invention and from the viewpoint of obtaining a lightweight property, the pressure vessel is preferably linerless.

Hereinafter, the pressure vessel will be described focusing on the linerless pressure vessel.

The pressure vessel may be provided with a space to be filled with a gas therein, and is usually hollow. The shape of the pressure vessel is described with reference to the drawings.

Figure 2:
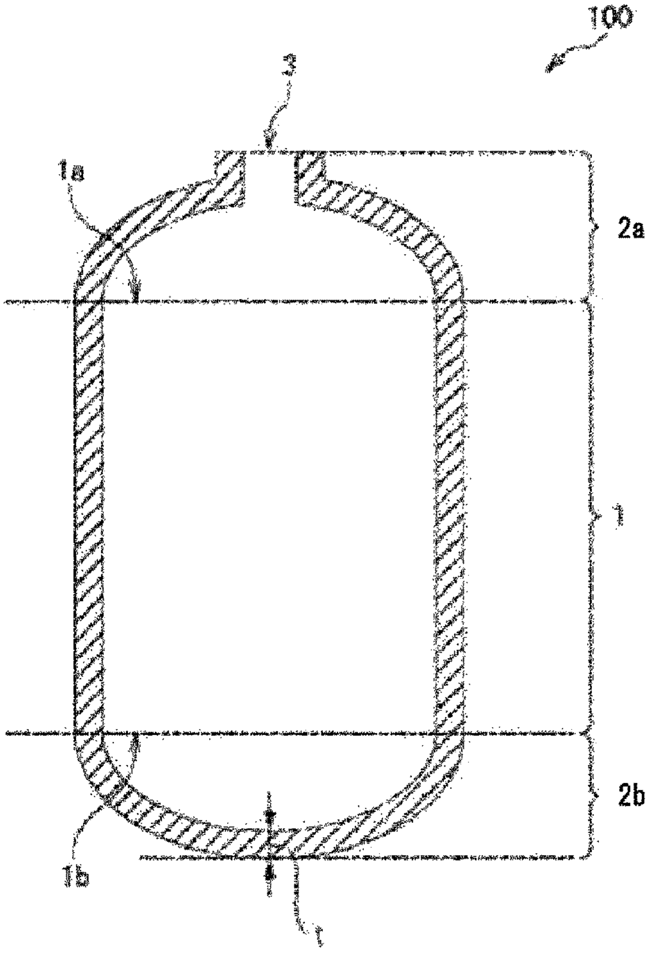
FIG. 2 is a cross-sectional schematic view illustrating a linerless pressure vessel according to an embodiment.

FIG. 2 is a schematic cross-sectional view illustrating an embodiment of a pressure vessel. In FIG. 2, a linerless pressure vessel 100 includes a cylindrical portion 1 and two dome portions 2*a* and 2*b* that seal both ends (1*a* and 1*b*) of the cylindrical portion 1.

Each of the dome portions 2*a* and 2*b* is hollow, and at least one of the dome portions (the dome portion 2*a* in FIG. 1) can be provided with, at a top part of the dome portion, an opening 3 for joining a valve or the like for a pressure vessel. A valve or the like for a pressure vessel may be installed in the dome portion in advance.

The pressure vessel can be provided with any layer (not illustrated) such as a protective layer, a coating layer, or a layer containing a rust-proofing agent as necessary.

The fiber-reinforced composite material constituting the pressure vessel 100 is formed using the prepreg obtained in Step (II). The pressure vessel 100 constituted from the fiber-reinforced composite material having a helical structure, a braided structure, a spiral structure, or the like can be obtained by molding the prepreg, preferably the tow prepreg, obtained in Step (II) through the braiding method, the winding method, the 3D printing method, or the like. That is, the prepreg (preferably, the tow prepreg) obtained in Step (II) of the manufacturing method described above is disposed such that the pressure vessel has a helical structure, a braided structure, or a spiral structure in Step (III).

From the viewpoint of improving gas barrier properties, strength, impact resistance, and the like, the fiber-reinforced composite material constituting the pressure vessel 100 preferably has a braided structure or a spiral structure. The braided structure and the spiral structure are structures in which a cured product of the prepreg constituted from a thermosetting resin or composition and a continuous reinforcing fiber bundle are arranged in a braided shape or a spiral shape without gaps, and the hollow-shaped pressure vessel 100 is thereby formed.

For example, a pressure vessel having a braided structure can be manufactured by molding with a braiding method using a tow prepreg constituted from a thermosetting resin or composition and a continuous reinforcing fiber bundle in Step (III). In addition, a pressure vessel having a spiral structure can be manufactured using the tow prepreg by molding through a unidirectional braiding method, the winding method, or the 3D printing method. Pressure vessels with a braided structure or a spiral structure exhibit excellent gas barrier properties, strength, and impact resistance, and are also advantageous in terms of productivity.

From the viewpoint of gas barrier properties, strength, impact resistance, and productivity, at least the cylindrical portion 1 constituting the pressure vessel 100 preferably has a braided structure or a spiral structure. The dome portions 2*a* and 2*b* constituting the pressure vessel 100 may also be constituted from a fiber-reinforced composite material having a braided structure or a spiral structure, but are not particularly limited.

The pressure vessel 100 in FIG. 2 may be molded by individually producing the cylindrical portion and the dome portions and then joining the components thereof, or the cylindrical portion and the dome portions may be integrally molded. From the viewpoint of the productivity, integrally molding the cylindrical portion 1 and at least one of the dome portions is preferable.

The use of the braiding method, the winding method, or the 3D printing method in Step (III) enables the cylindrical portion and the dome portions of the pressure vessel to be easily and integrally molded.

In a case where the dome portion of the pressure vessel is separately produced, the production method is not particularly limited, and for example, a prepreg obtained by impregnating the reinforcing fibers in advance with a thermosetting resin or composition can be hot press molded using a mold. When the thermosetting resin or composition to be used are solvent-free, the dome portion can be produced through a known molding method such as vacuum assisted resin transfer molding (Va-RTM), resin transfer molding (RTM), and high pressure resin transfer molding (HP-RTM).

At this time, the thermosetting resin or composition and the reinforcing fibers constituting the dome portion are the same materials as the materials constituting the cylindrical portion of the pressure vessel.

In a case where a member is molded through the manufacturing method of the present invention, the member with only the cylindrical portion sealed or only one end of the cylindrical portion of the pressure vessel sealed, a separately produced dome portion can be joined and sealed to one or both ends of the cylindrical portion to manufacture the pressure vessel.

The thickness (t in FIG. 2) of the pressure vessel 100 can be appropriately selected according to details such as the volume and shape of the pressure vessel, and the thickness of the continuous reinforcing fibers or outer diameter of the fiber bundles to be used. From the viewpoint of ensuring sufficient pressure resistance and gas barrier properties such as a hydrogen gas barrier property for the pressure vessel, the thickness of the pressure vessel is 100 μm or more, more preferably 200 μm or more, and even more preferably 400 μm or more, and from the viewpoint of reducing the size and weight of the pressure vessel, the thickness of the pressure vessel is preferably 60 mm or less, and more preferably 40 mm or less.

Resin Impregnating Apparatus

The present invention provides a resin impregnating apparatus including: a mechanism that feeds a continuous reinforcing fiber bundle; a nozzle that ejects a thermosetting resin or a thermosetting resin composition to a surface of the continuous reinforcing fiber bundle; and a mechanism that twists the continuous reinforcing fiber bundle.

The resin impregnating apparatus is suitably used in Step (I) and Step (II) of the manufacturing method of the present invention.

The resin impregnating apparatus of the present invention is described with reference to the drawings.

Figure 3:
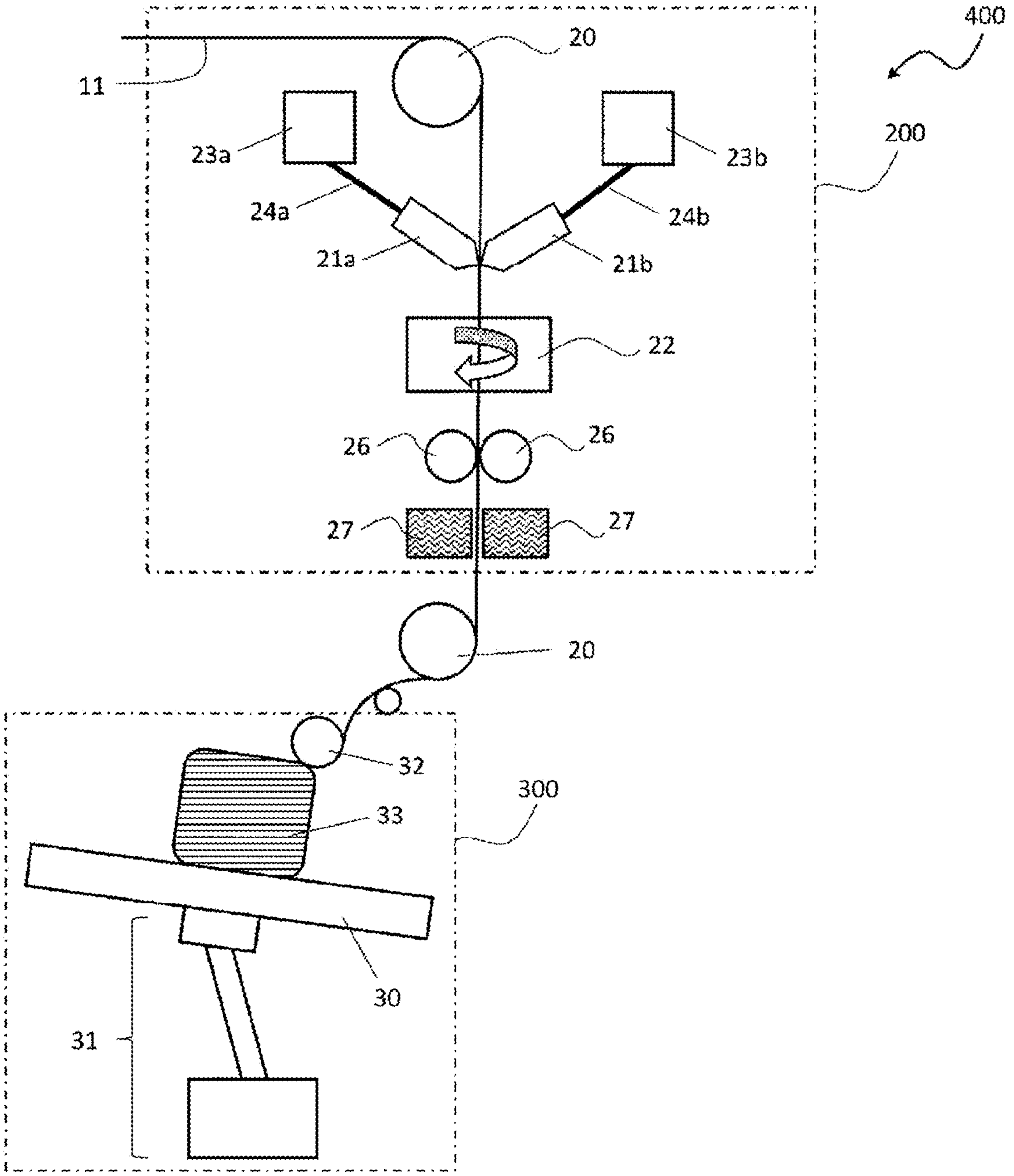
FIG. 3 is a schematic view illustrating a resin impregnating apparatus and a 3D printer including the resin impregnating apparatus according to an embodiment of the present invention.

FIG. 3 is a schematic view illustrating an embodiment of a resin impregnating apparatus of the present invention and a 3D printer equipped with the resin impregnating apparatus. In FIG. 3, a resin impregnating apparatus 200 includes: a feeding roll 20 that feeds a continuous reinforcing fiber bundle 11, nozzles 21 (21*a* and 21*b*) that eject a thermosetting resin or a thermosetting resin composition to coat the surface of the fed continuous reinforcing fiber bundle 11; and a twisting mechanism 22 that twists the continuous reinforcing fiber bundle 11.

The nozzles 21 are mechanisms that eject the thermosetting resin or the thermosetting resin composition to coat the surface of the continuous reinforcing fiber bundle 11, and can perform Step (I) in the manufacturing of the present invention.

Tanks 23 (23*a* and 23*b*) filled with the thermosetting resin or composition are connected to the nozzles 21, and the thermosetting resin or composition is supplied from the tanks 23 to the nozzles 21 via resin supply lines 24 (24*a* and 24*b*). When the two-part thermosetting resin composition containing the main agent (A) and the curing agent (B) is used as the thermosetting resin composition, it is preferable to include the tank 23*a* into which the main agent (A) or a composition thereof is filled and the tank 23*b* into which the curing agent (B) or a composition thereof is filled. This configuration makes it easy to use a thermosetting resin composition having a short pot life in Step (I).

In FIG. 3, the resin supply line 24*a* and the nozzle 21*a* are sequentially connected to the tank 23*a*, and the resin supply line 24*b* and the nozzle 21*b* are sequentially connected to the tank 23*b*. The nozzles 21*a* and 21*b* are provided at positions facing each other to sandwich the side surface of the continuous reinforcing fiber bundle 11, and the nozzle 21*a* ejects the main agent (A) or a composition thereof to one side surface of the continuous reinforcing fiber bundle 11, and the nozzle 21*b* ejects the curing agent (B) or a composition thereof to the other side surface, thereby achieving coating.

In an aspect in which the two-part thermosetting resin composition containing the main agent (A) and the curing agent (B) is used as the thermosetting resin composition, when coating the surface of the continuous reinforcing fiber bundle 11 with the main agent (A) or a composition thereof and the curing agent (B) or a composition thereof after subjected to collisional mixing, it is preferable to provide a merging portion 25 (not illustrated) of the resin supply line 24*a* connected to the tank 23*a* and the resin supply line 24*b* connected to the tank 23*b* at the upstream side of the nozzles 21. Thus, the main agent (A) or the composition thereof and the curing agent (B) or the composition thereof are mixed at the merging portion 25, and the obtained thermosetting resin composition can be supplied to the nozzles 21. The merging portion 25 can be constituted by a T-shaped pipe or the like.

The resin impregnating apparatus 200 includes the twisting mechanism 22. Step (II) in the manufacturing method of the present invention can be performed by the twisting mechanism 22. The twisting mechanism 22 is provided at the downstream side of the nozzles 21.

The twisting mechanism 22 twists the continuous reinforcing fiber bundle 11 coated with the thermosetting resin or composition using the nozzles 21, preferably in a circumferential direction substantially perpendicular to the traveling direction. Thus, the continuous reinforcing fiber bundle 11 can be sufficiently impregnated and mixed with the thermosetting resin or composition.

In Step (II) in the manufacturing method of the present invention, when the continuous reinforcing fiber bundle 11 is twisted in one direction, the untwisting step can be performed by causing the twisting mechanism 22 to twist the continuous reinforcing fiber bundle 11 in the opposite direction.

The twisting mechanism 22 may be the twisting mechanism illustrated in FIG. 1.

The resin impregnating apparatus 200 may include nip rolls 26 that remove the excessive thermosetting resin or composition applied to the continuous reinforcing fiber bundle 11, at the downstream side of the twisting mechanism 22.

The resin impregnating apparatus 200 may further include drying mechanisms 27 as necessary. The drying mechanisms 27 are preferably provided at the downstream side of the twisting mechanism 22 (at the downstream side of the nip rolls 26 when the nip rolls 26 are provided).

The drying mechanisms 27 are provided to remove the solvent in the thermosetting resin composition penetrated into the continuous reinforcing fiber bundle 11, and examples of the form thereof include a hot air dryer, a heater, a heating roll, and a hot plate.

The continuous reinforcing fiber bundle 11 impregnated with the thermosetting resin composition containing the solvent passes through the drying mechanisms 27, and thus the solvent is removed and a prepreg is formed.

3D Printer

The present invention further provides a 3D printer equipped with the resin impregnating apparatus. The 3D printer is suitably used in the manufacturing method of the present invention.

The 3D printer of the present invention preferably includes at least the resin impregnating apparatus and a robot arm. Step (I) and Step (II) are performed by the resin impregnating apparatus, the obtained prepreg is used, the molding in Step (III) is performed by a robot arm portion, and thus a three-dimensional molded article can be easily manufactured.

A 3D printer 400 illustrated in FIG. 3 includes the resin impregnating apparatus 200 and a robot arm 300.

The robot arm 300 includes a support table 30 for disposing the prepreg obtained in Step (II) and an arm portion 31 for holding the support table 30. The arm portion 31 holds the support table 30, and mechanically controls the support table 30 to freely change the positions (X, Y, and Z directions), rotation direction, and inclination of the support table 30. The arm portion 31 is connected to, for example, the lower surface of the support table 30 to hold the support table 30.

The positions, rotation direction, and inclination of the support table 30 are freely changed by the operation of the arm portion 31, and this operation causes the prepreg supplied from the resin impregnating apparatus 200 to be disposed in a desired shape on the support table 30. The operation of the arm portion 31 is controlled by, for example, a control device (not illustrated) in accordance with programming.

The prepreg supplied from the resin impregnating apparatus 200 toward the robot arm 300 is disposed and laminated on the support table 30 while being pressed by a laminating roll 32, and is molded into a desired shape. Even in the case of molding a linerless pressure vessel, this method enables batch molding without using a core such as a mandrel.

Next, a laminate 33 obtained by disposing the prepreg on the support table 30 is heated to obtain a molded article including a fiber-reinforced composite material. The laminate 33 in a state of being disposed on the support table 30 may be subjected to a heating mechanism, or may be moved from the support table 30 and subjected to the heating mechanism.

EXAMPLES

Next, the present invention will be described specifically with reference to examples. However, the present invention is not limited in any way by these examples.

Measurements and evaluations in the present examples were performed by the following methods.

Hydrogen gas permeability coefficient [cc·cm/($cm^2$·s·cmHg)]A bar coater was used to apply a mixture (epoxy resin composition) of the main agent and the curing agent solution used in Example 1 to a smooth metal plate coated with a mold release agent. The mixture was applied in a 200 mm square at a thickness of 100 μm and then heated and cured at 100° C. for 5 minutes to produce a cured product. The hydrogen gas permeability coefficient of this cured product was measured in a dried state at 23° C. using the cured product and a water vapor permeability measuring device ("G2700 T•F", available from GTR Tec Corporation).

Impregnability

In each of the examples, the impregnation properties of the thermosetting resin composition into the continuous reinforcing fiber bundle were evaluated by the following method.

Any vertical cross section of the molded article was polished, and an image of the cross section was captured using an ultra-deep color 3D shape-measuring microscope. In the obtained cross-sectional photograph, a region at which the epoxy resin composition as the thermosetting resin composition was impregnated was selected using the image analysis software "ImageJ", and the area thereof was measured. The impregnation rate was expressed as (area of region impregnated with epoxy resin composition)/(area of entire region−area of region including continuous reinforcing fiber bundle)×100(%).

The region impregnated with epoxy resin composition refers to a region in which the thermosetting resin composition penetrates between continuous carbon fibers and/or continuous glass fibers such that air between the fibers is removed. That is, in the region impregnated with epoxy resin composition, the cured product of the thermosetting resin composition is present between the continuous carbon fibers or the continuous glass fibers.

As the ultra-deep color 3D shape-measuring microscope, the VK-9500 (controller section)/VK-9510 (measurement section) (available from Keyence Corporation) was used.

The impregnation properties were determined according to the following criteria.

[Evaluation Criteria]

AA: Impregnation rate is 100%.

A: Impregnation rate is 95% or more and less than 100%.

B: Impregnation rate is 90% or more and less than 95%.

C: Impregnation rate is less than 90%.

Glass Transition Temperature (Tg)

The glass transition temperature Tg of a matrix resin (a cured product of an epoxy resin composition) of the fiber-reinforced composite material obtained in each of the examples was measured using a differential scanning calorimeter device ("DSC 25", available from TA Instruments).

Under a nitrogen stream, approximately 5 mg of a sample (a cured product of an epoxy resin composition) was subjected to a thermal history under the following conditions. The thermal history conditions included a first temperature increase (at a temperature increase rate of 10° C./min), followed by cooling (at a temperature decrease rate of 10° C./min), and then a second temperature increase (at a temperature increase rate 10° C./min). The heating temperature was from room temperature to 225° C., and the peak temperature of the glass transition temperature observed in the second temperature increase was read and is indicated in Table 1. In the examples in which the same thermosetting resin composition was used, a higher Tg means that the main agent and the curing agent in the thermosetting resin composition were sufficiently mixed.

Production Example 1

Preparation of Epoxy Resin Curing Agent Solution B-1

A reaction vessel was charged with 1 mol of meta-xylylenediamine (MXDA). The temperature was raised to 60° C. under a nitrogen stream, and 0.93 mol of methyl acrylate was added dropwise over 1 hour. The temperature was increased to 165° C. while generated methanol was distilled off, and the temperature was then maintained at 165° C. for 2.5 hours, and thereby an epoxy resin curing agent was obtained as a reaction product between the MXDA and the methyl acrylate. Methanol was then added dropwise to the epoxy resin curing agent over 1.5 hours, and an epoxy resin curing agent solution B-1 containing 65 mass % of the epoxy resin curing agent and 35 mass % of methanol was obtained.

Example 1 (Production and Evaluation of Molded Article)

An epoxy resin ("TETRAD-X", available from Mitsubishi Gas Chemical Company, Inc.) having a glycidylamino group derived from meta-xylylenediamine was used as a main agent of the thermosetting resin composition, the epoxy resin curing agent solution B-1 obtained in Production Example 1 was used as a curing agent, and a carbon fiber roving ("T700SC-12000", available from Toray Industries, Inc., the number of filaments: 12000, fineness: 800 tex, cross-sectional shape of carbon fiber roving: elliptical) was used as continuous reinforcing fibers.

The main agent was first applied to one side surface of the carbon fiber roving such that the (the number of active amine hydrogens in the epoxy resin curing agent)/(the number of epoxy groups in the epoxy resin) became 1.2, and the total solid content mass of the main agent and the curing agent was 700 g/1000 m, and then the curing agent solution B-1 was applied to the other side surface (Step (I)). The obtained roving was twisted by 100 turns per meter in the circumferential direction and then twisted by 100 turns per meter in the opposite direction to untwist the twist, and the roving was impregnated and mixed with the main agent and the curing agent solution. Next, an operation (squeezing step) of removing the excess resin composition (the main agent and the curing agent solution) was performed using nip rolls. Further, the mixture was heated and dried in a hot air dryer at 60° C. for 6 minutes to remove the solvent, and thus a tow prepreg was obtained (Step (II)).

The obtained tow prepreg was disposed in a spiral structure to have a tank shape and molded, and then thermally cured at 120° C. for 1 hour to produce a molded article including a carbon fiber-reinforced composite material (Step (III).

The evaluations were conducted by the methods described above using the obtained molded article. The results are shown in Table 1.

The hydrogen gas permeability coefficient of the cured product of the mixture (epoxy resin composition) of the main agent and the curing agent solution used in Example 1 was measured by the method described above and was $3.9\times10^{-11}$ [cc·cm/(cm$^2$·s·cmHg)].

Example 2

A molded article was produced and evaluated in the same manner as Example 1 with the exception that the squeezing step was not performed in Step (II) of Example 1. The results are shown in Table 1.

Example 3

A molded article was produced and evaluated in the same manner as Example 1 with the exception that the untwisting step and the squeezing step were not performed in Step (II) of Example 1. The results are shown in Table 1.

Example 4

A molded article was produced and evaluated in the same manner as Example 1 with the exception that a liquid epoxy resin having glycidyloxy derived from bisphenol A ("jER828" available from Mitsubishi Chemical Corporation, epoxy equivalent: 186 g/equivalents) was used as a main agent of the thermosetting resin composition, and 1,3-bis(aminomethyl) cyclohexane (1,3-BAC, available from Mitsubishi Gas Chemical Company, Inc.) was used as a curing agent at a ratio at which the (the number of active amine hydrogens in the epoxy resin curing agent)/(the number of epoxy groups in the epoxy resin) became 1.0. The results are shown in Table 1.

Example 5

A molded article was produced and evaluated in the same manner as Example 1 with the exception that a bundle of 16 glass fiber rovings ("E-glass yarn ECG 75 1/0 0.7Z", available from Nitto Boseki Co., Ltd., filament diameter: 9.1 μm, the number of filaments: 400, fineness: 68.7 tex, cross-sectional shape: circular) was used instead of the carbon fiber roving in Example 1. The results are shown in Table 1.

Example 6

An epoxy resin ("TETRAD-X", available from Mitsubishi Gas Chemical Company, Inc.) having a glycidylamino group derived from meta-xylylenediamine was used as a main agent of the thermosetting resin composition, the epoxy resin curing agent solution B-1 obtained in Production Example 1 was used as a curing agent, and a carbon fiber roving ("T700SC-12000", available from Toray Industries, Inc.) was used as continuous reinforcing fibers.

A molded article was produced and evaluated in the same manner as Example 2 with the exception that in Step (I) of Example 2, the main agent and the curing agent solution were subjected to collisional mixing immediately before being applied to the carbon fiber roving, and then applied to the carbon fiber roving. The collisional mixing was performed by feeding the main agent from the left side and feeding the curing agent solution from the right side to a T-shaped feeding pipe (T-shaped pipe), and causing them to collide with each other at a branch point at the center of the T-shaped pipe. The liquid mixture flowing out from the bottom of the T-shaped pipe was applied to the carbon fiber roving. The results are shown in Table 1. The pot life of the epoxy resin composition obtained by subjecting the main agent and the curing agent solution to collisional mixing was 10 minutes. The pot life was measured by the method described in the specification.

Comparative Example 1

A molded article was produced and evaluated in the same manner as Example 1 with the exception that Step (II) was not performed in Example 1. The results are shown in Table 1.

Comparative Example 2

An epoxy resin ("TETRAD-X", available from Mitsubishi Gas Chemical Company, Inc.) having a glycidylamino group derived from meta-xylylenediamine was used as a main agent of the thermosetting resin composition, the epoxy resin curing agent solution B-1 obtained in Production Example 1 was used as a curing agent, and a carbon fiber roving ("T700SC-12000", available from Toray Industries, Inc.) was used as a continuous reinforcing fiber bundle.

A molded article was produced and evaluated in the same manner as Comparative Example 1 with the exception that in Step (I) of Comparative Example 1, the main agent and the curing agent solution were subjected to collisional mixing immediately before being applied to the carbon fiber roving, and then applied to the carbon fiber roving. The collisional mixing was performed in the same manner as Example 6. The results are shown in Table 1.

Comparative Example 3

A molded article was produced and evaluated in the same manner as Comparative Example 1 with the exception that the squeezing step using nip rolls was performed after Step (I) in Comparative Example 1. The results are shown in Table 1.

Table 1 shows the shapes of the prepregs after Step (II). The "elliptic column" and "circular column" mean that the cross-sectional shapes perpendicular to the traveling direction of the tow prepreg are elliptical and circular, respectively, and the "spiral column" means that the tow prepreg is twisted.

TABLE 1

| | | | Examples | | | | | | Comparative Examples | | |
|---|---|---|---|---|---|---|---|---|---|---|---|
| | | | 1 | 2 | 3 | 4 | 5 | 6 | 1 | 2 | 3 |
| Fiber-reinforced composite material | Components of thermosetting resin composition | Main agent (A) | TETRAD-X | TETRAD-X | TETRAD-X | jER828 | TETRAD-X | TETRAD-X | TETRAD-X | TETRAD-X | TETRAD-X |
| | | Curing agent (B) | B-1 | B-1 | B-1 | 1,3-BAC | B-1 | B-1 | B-1 | B-1 | B-1 |
| | Continuous reinforcing fiber | | Carbon fiber | Carbon fiber | Carbon fiber | Carbon fiber | Glass fiber | Carbon fiber | Carbon fiber | Carbon fiber | Carbon fiber |
| Step (I) | Collisional mixing of main agent and curing agent | | None | None | None | None | None | Present | None | Present | None |
| Step (II) | Twisting | | Present | Present | Present | Present | Present | Present | None | None | None |
| | Untwisting | | Present | Present | None | Present | Present | Present | None | None | None |
| | Squeezing step | | Present | None | None | Present | Present | None | None | None | Present |
| | Shape of prepreg after Step (II) | | Elliptic column | Circular column | Spiral column | Elliptic column | Circular column | Circular column | Circular column | Circular column | Elliptic column |
| Evaluation Results | Impregnability | | AA | A | B | AA | A | A | C | C | C |
| | Tg (° C.) | | 115 | 113 | 82 | 130 | 115 | 115 | 71 | 115 | 77 |

Table 1 shows that, in the manufacturing method in which Steps (I) to (III) specified in the present invention, in this order, were performed in Examples, the impregnation properties of the thermosetting resin composition into the continuous reinforcing fiber bundle was increased, the main agent and the curing agent were sufficiently mixed in the continuous reinforced fiber bundle even when the main agent and the curing agent constituting the thermosetting resin composition were separately supplied, thereby achieving a high Tg. In particular, the impregnation properties of the thermosetting resin composition are further improved by performing the untwisting step and the squeezing step in Step (II).

INDUSTRIAL APPLICABILITY

According to the present invention, it is possible to provide a method for manufacturing a molded article consisting of a fiber-reinforced composite material containing a cured product of a thermosetting resin or a thermosetting resin composition and a continuous reinforcing fiber bundle, in which a thermosetting resin or composition having a short pot life can be used, and the impregnation properties of the thermosetting resin or composition into the continuous reinforcing fiber bundle can be improved, a resin impregnating apparatus suitably used for the manufacturing method, and a 3D printer.

According to the manufacturing method of the present invention, a linerless pressure vessel can be easily manufactured. The pressure vessel is suitable as a vehicle-mounted high-pressure gas storage tank, and because the pressure vessel is lightweight, the pressure vessel can improve the fuel economy of the vehicle on which it is mounted.

REFERENCE SIGNS LIST

100 Pressure vessel
1 Cylindrical portion
1*a*, 1*b* End part of cylindrical portion
2*a*, 2*b* Dome portion
3 Opening
11 Continuous reinforcing fiber bundle
200 Resin impregnating apparatus
20 Feeding roll
21, 21*a*, 21*b* Nozzle
22 Twisting mechanism
23, 23*a*, 23*b* Tank
24, 24*a*, 24*b* Resin supply line
26 Nip roll
27 Drying mechanism
300 Robot arm
30 Support table
31 Arm portion
32 Laminating roll
33 Prepreg laminate
400 3D printer

The invention claimed is:

1. A method for manufacturing a molded article, the molded article consisting of a fiber-reinforced composite material comprising: a cured product of a thermosetting resin composition; and a continuous reinforcing fiber, the method comprising, in this order, the following Steps (I) to (III):

Step (I): a coating step of coating a surface of a continuous reinforcing fiber bundle with the thermosetting resin composition, wherein the continuous reinforcing fiber bundle is fed from a feeding roll;

Step (II): a resin impregnating step of twisting the continuous reinforcing fiber bundle after the Step (I) and obtaining a prepreg impregnated with the thermosetting resin composition, wherein the twisting direction is a circumferential direction substantially perpendicular to the longitudinal direction of the continuous reinforcing fiber bundle; and Step (III): a heating and molding step of disposing the prepreg obtained in the Step (II) and subsequently heating the disposed prepreg to cure the thermosetting resin composition, wherein the thermosetting resin composition comprises a two-part thermosetting resin composition comprising a main agent (A) and a curing agent (B);

wherein the main agent (A) comprises an epoxy resin (A1), and the curing agent (B) comprises an epoxy resin curing agent (B1) comprising a reaction product (X) of a component (x1) and a component (x2):

(x1) at least one selected from the group consisting of meta-xylylenediamine and para-xylylenediamine, and (x2) at least one selected from the group consisting of unsaturated carboxylic acids represented by General Formula (1) below and derivatives thereof:

(1)

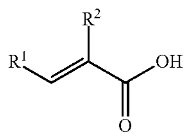

where in Formula (1), $R^1$ and $R^2$ each independently represent a hydrogen atom, an alkyl group having from 1 to 8 carbons, an aryl group having from 6 to 12 carbons, or an aralkyl group having from 7 to 13 carbons; or wherein the main agent (A) comprises an epoxy resin (A1), and the curing agent (B) comprises an epoxy resin curing agent not containing the reaction product (X), wherein the epoxy resin curing agent is a polyamine compound comprising at least one selected from the group consisting of 1,2 bis(aminomethyl) cyclohexane, 1,3 bis(aminomethyl) cyclohexane, 1,4 bis(aminomethyl) cyclohexane, isophoronediamine, ortho-xylylenediamine, meta-xylylenediamine, and para-xylylenediamine;

wherein the Step (I) comprises a step of coating the surface of the continuous reinforcing fiber bundle with the main agent (A) or a composition thereof by ejecting from a nozzle; and a step of coating the surface of the continuous reinforcing fiber bundle with the curing agent (B) or a composition thereof by ejecting from another nozzle; or wherein the Step (I) comprises a step of coating the surface of the continuous reinforcing fiber bundle with the thermosetting resin composition by ejecting from a nozzle after subjecting the main agent (A) or a composition thereof and the curing agent (B) or a composition thereof to collisional mixing.

2. The method for manufacturing a molded article according to claim 1, wherein the Step (II) comprises a step of untwisting after twisting the continuous reinforcing fiber bundle.

3. The method for manufacturing a molded article according to claim 1, wherein the Step (I) and Step (II) are performed using a resin impregnating apparatus comprising: a mechanism configured to feed the continuous reinforcing fiber bundle; and a mechanism configured to twist the continuous reinforcing fiber bundle.

4. The method for manufacturing a molded article according to claim 1, wherein the molding method in the Step (III) is a 3D printing method.

5. The method for manufacturing a molded article according to claim 1, wherein a pot life after mixing the main agent (A) and the curing agent (B) is 10 minutes or less.

6. The method for manufacturing a molded article according to claim 1, wherein a content of a solvent in the composition of the curing agent (B) is 40 mass % or less.

7. The method for manufacturing a molded article according to claim 1, wherein the composition of the main agent (A) is solvent-free.

8. The method for manufacturing a molded article according to claim 1, wherein the epoxy resin (A1) comprises, as a main component, an epoxy resin having a glycidylamino group derived from meta-xylylenediamine.

9. The method for manufacturing a molded article according to claim 1, wherein the molded article is a pressure vessel.

10. The method for manufacturing a molded article according to claim 9, wherein the pressure vessel is linerless.

11. A resin impregnating apparatus comprising:

a mechanism configured to feed a continuous reinforcing fiber bundle;

a nozzle configured to eject a thermosetting resin or a thermosetting resin composition to a surface of the continuous reinforcing fiber bundle; and a mechanism configured to twist the continuous reinforcing fiber bundle, wherein the mechanism configured to feed the continuous reinforcing fiber bundle comprises a feeding roll, the nozzle is to eject the thermosetting resin composition to coat the surface of the fed continuous reinforcing fiber bundle, the mechanism configured to twist the continuous reinforcing fiber bundle is provided at a downstream side of the nozzles, and the mechanism configured to twist the continuous reinforcing fiber bundle is the mechanism which twists the continuous reinforcing fiber bundle in a circumferential direction substantially perpendicular to the traveling direction, and wherein the mechanism configured to twist the continuous reinforcing fiber bundle has two take-up rolls, the mechanism comprises a mechanism that the continuous reinforcing fiber bundle sandwiched between the two take-up rolls is fed in the longitudinal direction of the continuous reinforcing fiber bundle by the rotation of the take-up rolls, the rotation axes of the two take-up rolls are inclined in directions opposite to each other, the continuous reinforcing fiber bundle is rotated in the circumferential direction, and is taken up in the axial direction while the continuous reinforcing fiber bundle is twisted.

12. The resin impregnating apparatus according to claim 11, further comprising a drying mechanism selected from the group consisting of a hot air dryer, a heating roll, and a hot plate, provided at a downstream side of the mechanism configured to twist the continuous reinforcing bundle.

13. A 3D printer comprising the resin impregnating apparatus described in claim 11.

14. The resin impregnating apparatus according to claim 11, further comprising nip rolls to remove the excessive thermosetting resin composition applied to the continuous reinforcing fiber bundle, at a downstream side of the mechanism configured to twist the continuous reinforcing fiber bundle.

* * * * *